(No Model.)

J. ARNAO, Jr.
BELT FOR MACHINERY.

No. 360,751. Patented Apr. 5, 1887.

WITNESSES

INVENTOR

Attorneys

UNITED STATES PATENT OFFICE.

JUAN ARNAO, JR., OF TROY, NEW YORK.

BELT FOR MACHINERY.

SPECIFICATION forming part of Letters Patent No. 360,751, dated April 5, 1887.

Application filed January 20, 1887. Serial No. 224,970. (No model.)

*To all whom it may concern:*

Be it known that I, JUAN ARNAO, Jr., a citizen of the United States, residing at Troy, in the county of Rensselaer and State of New York, have invented certain new and useful Improvements in Metallic Belts for Machinery; and I do hereby declare the following to be a full, clear, and exact description of the invention, such as will enable others skilled in the art to which it appertains to make and use the same.

My invention relates to an improved combination metallic belt for transmitting power, especially where such belts are used upon machinery to facilitate speed.

The object of my invention is to assist the propelling power, thereby accelerating the motion, as well as maintaining a uniform tension and compensating for varying resistance and distance. I attain these objects by the means illustrated in the accompanying drawings, in which—

Figure 1:
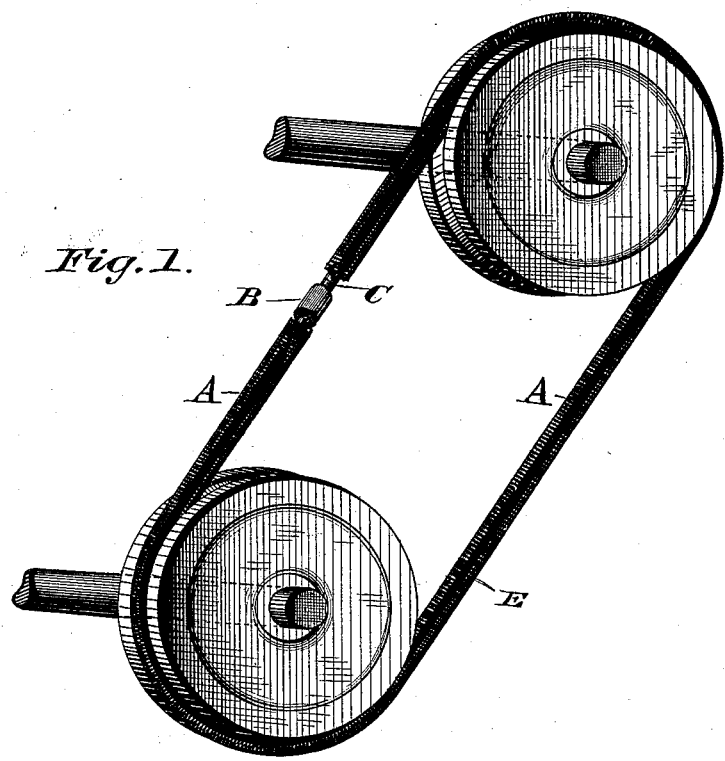
Figure 2:
Figure 3:
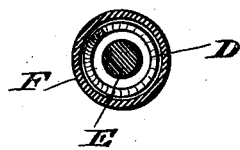

Figure 1 is a general perspective view of belt A and fastenings B C in position on wheels. Fig. 2 is a view where D is the helically-coiled wire and E the inclosed rubber cord. Fig. 3 is a transverse section of belt A, in which is shown rubber cord E, helically-coiled metallic wire D, and rubber covering F.

Similar letters refer to similar parts throughout.

My invention A consists of the combination of suitably-coiled metallic wire D, rubber cord E, and rubber covering F, with fastenings B C.

D is made of suitable metallic wire, such as will retain its position under usual pressure, helically coiled upon rubber cord E, whose circumference is not greater but equal to the inner circumference of metallic wire D. Metallic wire D, helically coiled upon rubber cord E, is inclosed by rubber covering F, whose inner circumference is equal to circumference of metallic wire D, held together by fastenings B C.

Fastenings B C consist of screw and bore, firmly fixed to ends of belt A by means of metallic wire D, passing diametrically through one end of fastenings B C and coiled round same end. Belt A can be made either round, flat, or semicircular in form, or as the grooves in wheels of machine may require.

I am aware that belts for transmitting power made of spirally-coiled wire are not new; but the objections to said belts are that the parts incident to friction abrade. This weakens the wire and causes it to become elongated, which renders the same inoperative by the loss of its elasticity. By the abrasion of the wire and the deposit of abraded parts in the grooves of the wheels it is necessary to frequently renew belts, causing stoppage of machinery and more or less expense. Again, the wire of belt being exposed, and coming in contact with the iron surface of the grooves of wheels, causes a disagreeable grating noise. My invention avoids all these objections. The function of rubber cord E is to assist in maintaining the elasticity of metallic wire D, preventing it from becoming elongated, and thereby inoperative. The rubber covering F is to prevent noise while machine is in operation, as well as abrasion of wire, which renders it inefficient.

Another important advantage of my invention over others is, where leather belts have been used on machines and have become too short for further use, or where it is desirous to use leather belts, a portion of the belt A, as herein described, with fastenings B C, can be used, thereby utilizing the old leather belt.

What I claim as new, and desire to secure by Letters Patent, is—

As an improved article of manufacture, a belt for machinery, consisting of helically-coiled metallic wire D upon rubber cord E, and rubber covering F, substantially as shown, and for the purpose set forth.

In testimony whereof I affix my signature in presence of two witnesses.

JUAN ARNAO, JR.

Witnesses:
 RAMON ARNAO,
 FLORENTINO GONZALEZ.